F. H. CRITTALL.
BLANK FOR MAKING METALLIC WINDOW SASHES AND FRAMES.
APPLICATION FILED FEB. 23, 1911.
1,002,228.
Patented Sept. 5, 1911.
2 SHEETS—SHEET 1.
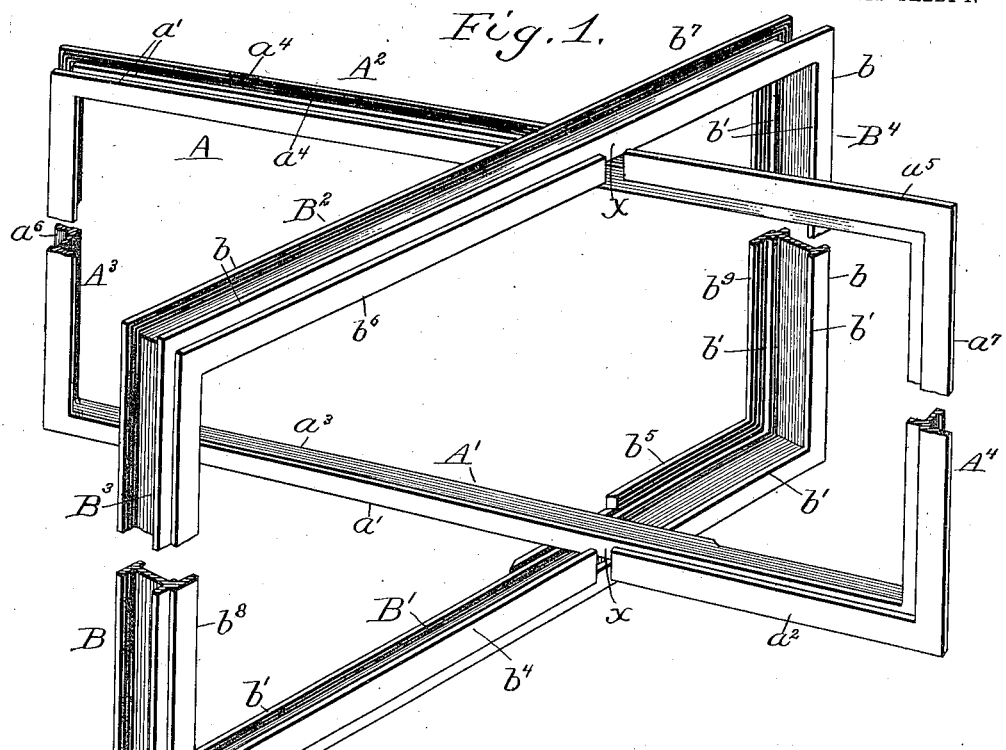
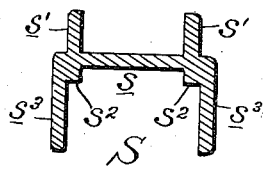
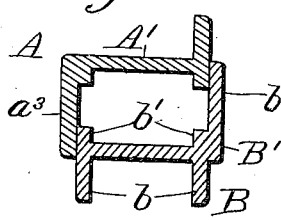
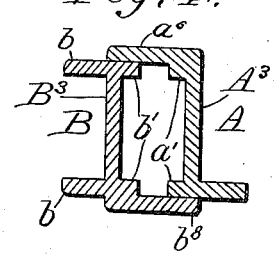
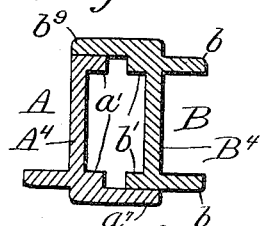
Witnesses
Inventor
F. H. CRITTALL.
Attorneys

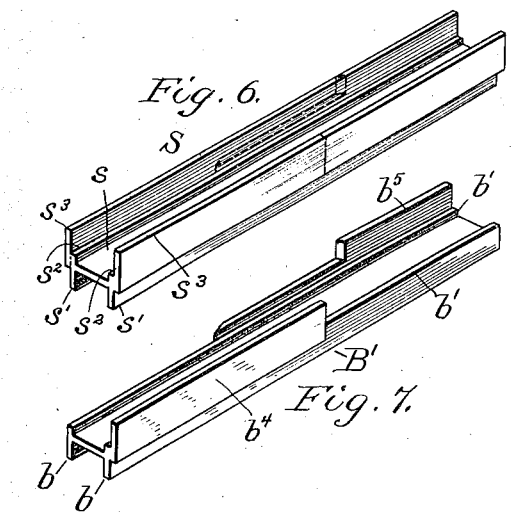

UNITED STATES PATENT OFFICE.

FRANCIS HENRY CRITTALL, OF BRAINTREE, ENGLAND.

BLANK FOR MAKING METALLIC WINDOW SASHES AND FRAMES.

1,002,228.     Specification of Letters Patent.     Patented Sept. 5, 1911.

Application filed February 23, 1911. Serial No. 610,238.

*To all whom it may concern:*

Be it known that I, FRANCIS HENRY CRITTALL, a subject of the King of Great Britain, residing at Manor Works, Braintree, in the county of Essex, England, have invented certain new and useful Improvements in Blanks for Making Metallic Window Sashes and Frames, of which the following is a specification.

The object of my invention is to provide a blank from which the various parts of the marginal metallic frame of a swinging window sash, and the marginal frame of the window may be constructed without the addition of other parts. Such sashes and window frames are commonly built up of several pieces secured together to provide the requisite stop flanges and weathering strips and to permit a proper hinge connection between the sashes and window frames.

According to my invention, I provide a blank having such formation that by cutting away certain parts and without the addition of other parts it may be shaped to form any one of the four marginal pieces of either the sash or the window frame.

In the accompanying drawings, Figure 1 is a perspective view of a swinging sash with a window frame made in accordance with my invention. Fig. 2 shows a transverse section through my improved blank. Fig. 3 shows a transverse section through the marginal bottom piece of the sash and the bottom piece of the window frame when the window is closed, the section being taken at the right-hand side of the hinge shown in Fig. 1. Fig. 4 shows a horizontal section through the side pieces of the frames on the left-hand side of Fig. 1 when the window is closed. Fig. 5 is a similar view at the right-hand side of Fig. 1. Fig. 6 is a perspective view of the blank which may be employed for all parts of the frames, but indicating by dotted lines how the blank is cut to form the bottom piece of the window frame. Fig. 7 is a similar view showing how this piece will appear when the proper parts of the blank are removed. Fig. 8 is a perspective view of the blank showing by dotted lines how it is cut to form the top piece of the window frame. Fig. 9 is a perspective view showing how the blank will appear when cut in the manner shown in Fig. 8. Fig. 10 is a perspective view of the blank showing by dotted lines how it is cut to form the bottom piece of the sash frame. Fig. 11 shows the appearance of the blank after it is cut in the manner indicated in Fig. 10. Fig. 12 is a perspective view of the blank showing by dotted lines how it is cut to form the top piece of the sash. Fig. 13 shows the appearance of the blank after the proper parts are removed. Fig. 14 is a perspective view of the blank; and Fig. 15 shows the appearance of the blank after a part has been removed to form the left-hand side piece of the marginal frame of the window frame. Fig. 16 is a perspective view of the blank indicating by dotted lines where it is cut to form the left-hand side piece of the sash. Fig. 17 is a perspective view of the blank after it is cut to form the left-hand side piece of the sash. Fig. 18 is a perspective view of the blank indicating by dotted lines where it is cut to form the right-hand side of the window frame; and Fig. 19 shows the shape of the blank after it is cut. Fig. 20 is a perspective view of the blank showing by dotted lines how it is cut to form the right-hand side piece of the sash frame; and Fig. 21 shows the appearance of the blank after it is cut in the manner indicated in Fig. 20.

In Fig. 1, A indicates the marginal frame of the swinging sash which is hinged at $x$ to the window frame B. The sash frame comprises the bottom piece $A'$, top piece $A^2$, and side pieces $A^3$, $A^4$ which are welded or otherwise suitably secured together at the corners. The window frame B comprises the bottom piece $B'$, top piece $B^2$ and side pieces $B^3$, $B^4$. The two frames are so formed as to provide double weathering, *i. e.*, there are overlapping flanges on all parts of the frames so arranged as to exclude wind and weather, the flanges being cut away at suitable parts to provide for the hinge connection, as shown in Fig. 1, and to allow the sash to swing properly. The four parts of the window frame B have outwardly projecting flanges $b$ forming a continuous channel all around the outside of the frame and short inwardly projecting flanges $b'$ forming a continuous channel all around the inside of the frame. The four pieces of the sash frame have short outwardly projecting flanges $a'$ forming a continuous channel around the outside of the sash frame and these flanges register with the flanges $b'$ when the sash is closed. The bottom piece $B'$ is formed on opposite sides with flanges $b^4$, $b^5$, as shown in Fig. 1, constituting stops and weathering. The top piece $B^2$ is formed with a front flange $b^6$ and a rear flange at $b^7$. The left-hand side piece, $B^3$ is formed with a front flange $b^8$ (but no corresponding back flange) and the right-hand side piece $B^4$ has a back flange $b^9$, but no corresponding front flange. The bottom piece $A'$ is formed with a front flange $a^2$ and a back flange at $a^3$, each of these flanges extending only part way from end to end of the sash. The top piece $A^2$ has a rear flange $a^4$ and a front flange at $a^5$. The left-hand side piece $A^3$ has a rear flange $a^6$ with no corresponding front flange, and the right-hand side piece has a front flange $a^7$ with no corresponding back flange. By this construction the sash frame and the window frame may be hinged together in such manner that the sash can freely swing and when the sash is closed there will be double weathering, i. e., there will be front and rear flanges which will fit tightly together and exclude wind and rain without packing or the application of additional strips of any kind.

By employing a blank of the kind shown in cross section in Fig. 2, any one of the different parts of the two frames may be made without the addition of other parts. Thus, in Fig. 6 if the blank S be cut on the dotted lines it will produce the formation shown in Fig. 7 which is suitable for the bottom piece of the window frame. If the blank be cut on the dotted lines shown in Fig. 8 a suitable formation will be produced for the top piece of the window frame. When the blank is cut in the manner indicated in Fig. 10, a suitable formation for the bottom piece of the sash is produced, and when the blank is cut in the manner indicated in Fig. 12, the top piece of the sash is formed. By cutting the blank in the manner indicated by dotted lines in Fig. 14 a suitable shape is produced for the left-hand side piece of the window frame and the left-hand side piece of the sash frame may be made as indicated in Figs. 16 and 17. The right-hand side piece of the window frame may be obtained as indicated in Figs. 18 and 19 and the right-hand side piece of the sash frame may be obtained in the manner indicated in Figs. 20 and 21. As the manner of cutting the blanks is clearly indicated in the drawing no further description appears to be necessary.

By reference to Fig. 2 it will be observed that the blank comprises a body portion $s$ having parallel flanges $s'$ projecting from one side, short flanges $s^2$ in line with the flanges $s'$ but projecting from the opposite sides of the body portion $s$ and flanges $s^3$ which connect with the outer sides of the flanges $s^2$ projecting beyond the outer ends of said flanges $s^2$ and being out of line with the flanges $s'$ and $s^2$.

I claim as my invention:

A metal blank for metallic sashes and window frames having a longitudinal body portion formed on one side near its opposite edges with outwardly projecting flanges forming a channel between them and on its opposite side with inwardly projecting relatively short flanges in line with the flanges before mentioned, said inwardly projecting flanges being formed integrally on their opposite outer sides with inwardly projecting relatively long flanges for the purpose specified.

In testimony whereof, I have hereunto subscribed my name.

FRANCIS HENRY CRITTALL.

Witnesses:
THOS. M. APPLEGARTH,
J. E. LITTLE.